C. W. CONNER.
MACHINE FOR FORMING LOCKS ON METALLIC PLATES.
APPLICATION FILED SEPT. 26, 1912.

1,114,862.

Patented Oct. 27, 1914.
10 SHEETS—SHEET 1.

Fig. 1

WITNESSES:
L. Chenwright
E. P. Hall.

INVENTOR.
C. W. Conner
BY J. Edward Maybee
ATTORNEY.

C. W. CONNER.
MACHINE FOR FORMING LOCKS ON METALLIC PLATES.
APPLICATION FILED SEPT. 26, 1912.

1,114,862.

Patented Oct. 27, 1914.
10 SHEETS—SHEET 6.

C. W. CONNER.
MACHINE FOR FORMING LOCKS ON METALLIC PLATES.
APPLICATION FILED SEPT. 26, 1912.

1,114,862.

Patented Oct. 27, 1914.
10 SHEETS—SHEET 7.

WITNESSES:
L. Chewright
E. P. Hall

INVENTOR.
C. W. Conner
BY J. Edward Maybee
ATTORNEY.

C. W. CONNER.
MACHINE FOR FORMING LOCKS ON METALLIC PLATES.
APPLICATION FILED SEPT. 26, 1912.

1,114,862.

Patented Oct. 27, 1914.
10 SHEETS—SHEET 9.

WITNESSES:

INVENTOR.
C. W. Conner
BY
J. Edward Maybee
ATTORNEY.

C. W. CONNER.
MACHINE FOR FORMING LOCKS ON METALLIC PLATES.
APPLICATION FILED SEPT. 26, 1912.

1,114,862.

Patented Oct. 27, 1914.
10 SHEETS—SHEET 10.

WITNESSES:
INVENTOR.
C. W. Conner.
BY
J. Edward Maybee
ATTORNEY.

UNITED STATES PATENT OFFICE.

CARLTON W. CONNER, OF TORONTO, ONTARIO, CANADA.

MACHINE FOR FORMING LOCKS ON METALLIC PLATES.

1,114,862.        Specification of Letters Patent.        Patented Oct. 27, 1914.

Application filed September 26, 1912. Serial No. 722,481.

*To all whom it may concern:*

Be it known that I, CARLTON WESCOTT CONNER, of the city of Toronto, Province of Ontario, Canada, have invented certain new and useful Improvements in Machines for Forming Locks on Metallic Plates, of which the following is a specification.

This invention relates to machines for forming the locks on metallic shingles and the like and my object is to devise a machine which will take in metal plates at one end and turn them out at the other end with the locks completely formed, thus saving the time and labor hitherto wasted in conveying the plates to and removing them from the separate machines, usually four in number, hitherto employed.

I attain my object by arranging in series and in proper relationship to a traveling bed the necessary mechanisms for forming the lock and by combining therewith means for imparting a stepwise movement to the bed and alternating therewith a simultaneous operating movement of the various lock-forming mechanisms. Means are also provided for suitably clamping the shingles on the bed when they are being operated on and for ejecting them after they have passed the last lock-forming mechanism, all substantially as hereinafter described and illustrated in the accompanying drawings in which—

In the drawings like numerals of reference indicate corresponding parts in the different figures.

Figure 1:
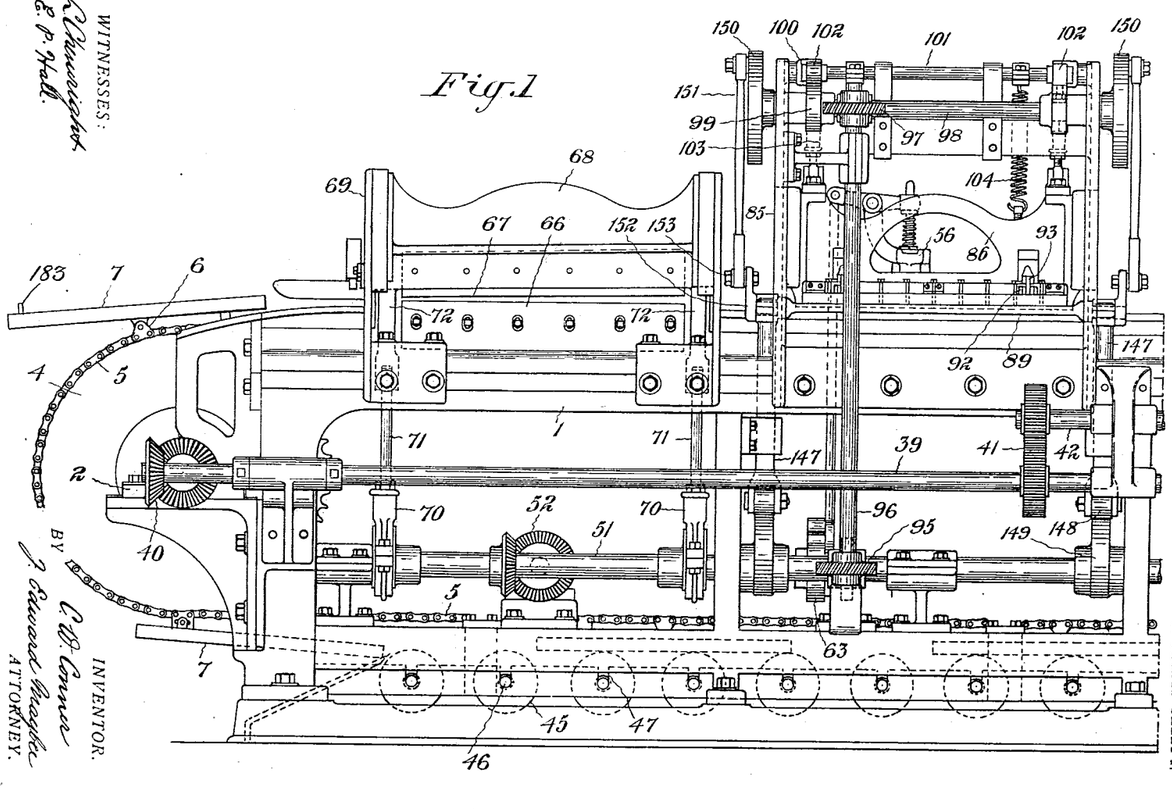
Figure 1 is a side elevation of one half of the machine.
Figure 2:
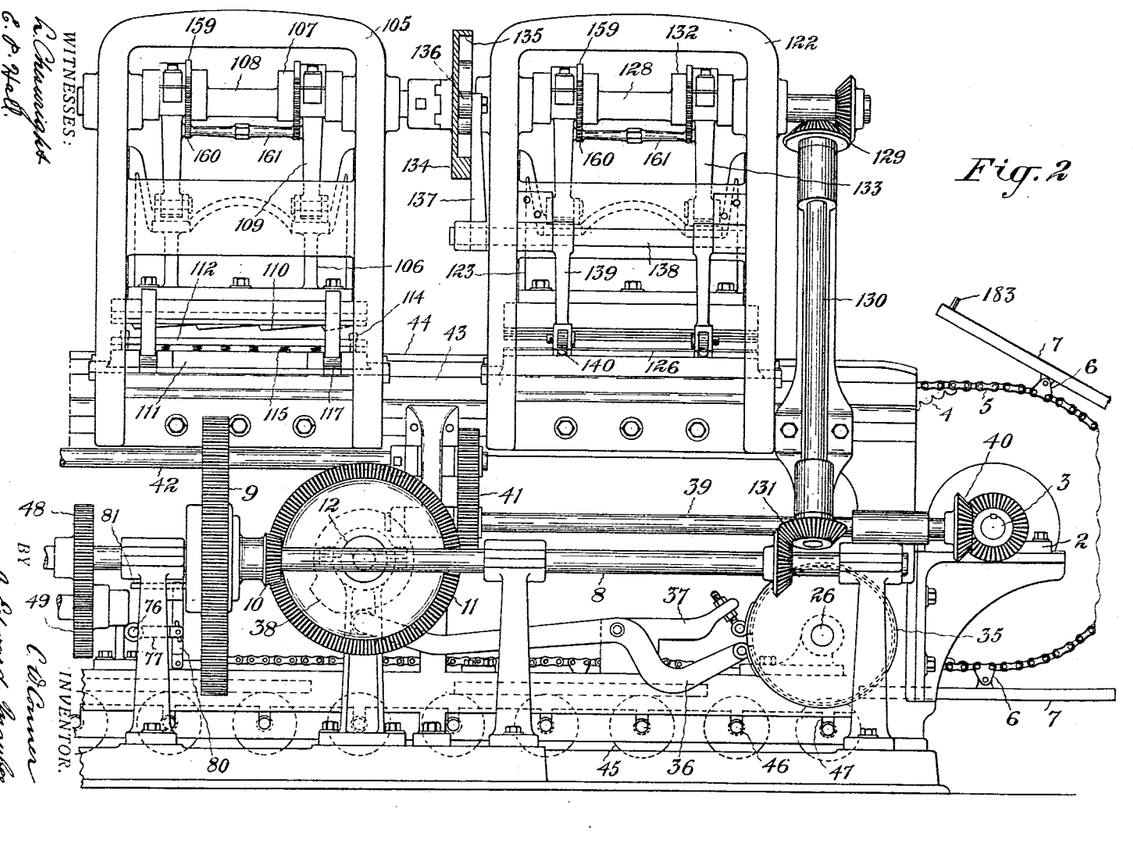
Fig. 2 is a side elevation of the other half of the machine and is to be used as a continuation of Fig. 1.
Figure 3:
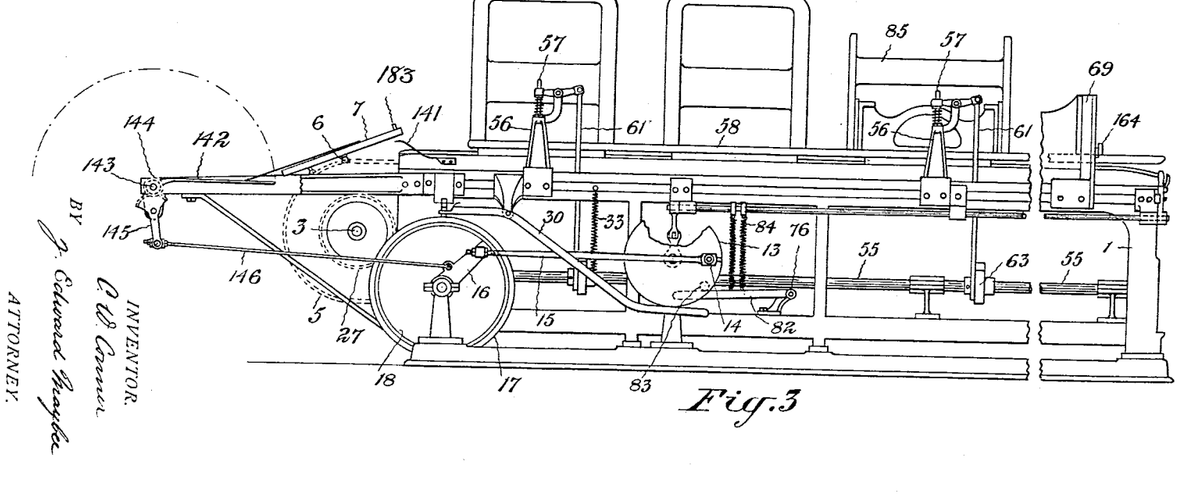
Fig. 3 is a side elevation on a smaller scale of the machine taken from the opposite side to Figs. 1 and 2 and illustrating only certain features of construction not clearly shown in said figures.

Referring particularly to Figs. 1, 2 and 3, 1 is the main frame of the machine suitably constructed to carry the different parts. At each end of the frame on adjustable bearings 2 is supported a shaft 3 carrying sprocket wheels 4 on which are carried the sprocket chains 5. Certain of the links of these chains are provided with lugs 6 on which are pivoted the plates or dies 7, each die being preferably connected with two pairs of lugs shown particularly in Fig. 3. These chains and dies form an endless traveling bed on which the metallic plates forming the shingles are supported as they are carried through the machine. These plates, as shown particularly in Figs. 2 and 6, have their surfaces shaped to the pattern of the metallic shingle to be caried thereby so that when the shingle is in place thereon, the plate contacts therewith substantially at every point of its surface and is practically held in rigid relationship with the plate.

The operation of the machine necessitates the traveling bed being given a stepwise movement. This is accomplished by the mechanism I will now describe.

8 is a longitudinal shaft which is given an intermittent movement as hereinafter described. On this shaft is the loose gear wheel 9 which may be driven in any suitable manner. This gear wheel has the bevel pinion 10 secured thereto. This bevel pinion meshes with the gear wheel 11 fast on the transverse shaft 12. To the other end of the shaft is secured the disk 13 carrying the wrist pin 14 on which is journaled one end of the connecting rod 15 to the other end of which is journaled the rock arm 16 rocking on the journal of the disk 17 which is preferably shaped as a drum open at one end, the rock arm fitting within the flange 18.

The rock arm and disk are adapted to have a ratcheting action by the following mechanism: Sliding in a suitable guide in the rock arm is a bolt 19, the end being adapted to engage in one of the holes 20 formed in the flange 18. This bolt is pressed yieldingly outwardly by means of the coil spring 21 preferably contained within a longitudinal hole bored in the bolt, the lower end of the spring engaging the rock arm. A finger 22 extends outwardly from the bolt through a slot 23 in the side of the rock arm. Located in the path of this finger adjacent the forward end of its path, as the rock arm moves forwardly, is a stationary cam 24 of such shape that as the finger is pressed against it the former will be pressed inwardly toward the center on which the rock arm oscillates. At the rearward end of the movement of the rock arm the bolt 19 is pressed by the spring 21 into engagement with one of the holes 20. At the forward end of the movement of the rock arm the bolt is withdrawn by the action of the cam 24 on the finger 22 as just described, and the rock arm set free to move rearwardly to engage the next rearward hole 20. By this means it will be seen that continuous movement of the shaft 12 is converted into an intermittent rotary movement of the disk 17. Of course, other devices might be employed for the same purpose.

The intermittent movements of the disk are imparted to the traveling bed by means of the gear wheel 25 fast on the shaft 26 of the disk 17 and meshing with the gear wheel 27 on the adjacent shaft 3.

As the metallic shingles supported on their dies 7 must be accurately positioned with respect to the lock-forming mechanisms it is necessary to provide a positive stop mechanism to stop the movements of the traveling bed and for that purpose I provide the following mechanism: A spring actuated latch is suitably carried on the main frame just above the flange 18 on the disk 17. This normally tends to move into position to engage the notches 29 formed in the exterior periphery of the flange 18. The forward side of each notch is preferably beveled as shown to guide the latch into position. Each time a notch 29 comes below the latch 28 the disk 17 will be positively stopped and the mechanism will be so timed that this will occur at the moment the rock arm 16 has reached the end of its forward stroke. To release the latch when the next movement of the bed is to take place I provide the following mechanism: The bent lever 30 is fulcrumed on the frame intermediate its ends. One end engages beneath the lug 31 formed on the latch 28 and the other lies on the path of the cam projection 32 guided by the disk 13. At the proper time the projection 32 engages the bent lever 30 and rocks it causing it to raise the lug 31 and thus release the latch. The cam lever is normally held in a latch freeing position by means of the coil spring 33 connected at one end with the frame and at the other to the lever.

As the traveling bed acquires some considerable momentum I find it necessary to provide frictional means to take up this momentum and thus ease the jar on the stop mechanism. For this purpose I provide the band brake 35 fast on the shaft 26. This band brake is actuated by means of the bent lever 36 (see Fig. 2) fulcrumed intermediate its ends and pivotally connected at one end to the band of the brake, the other end of the band being adjustably connected in the usual manner to a suitable stationary support 37. The other end of the bent lever lies in the path of the cam 38 rigidly secured to the shaft 12. This cam is so shaped and timed as to apply the band brake before the latch 28 engages one of the notches 29.

As it is desirable to drive the traveling bed from each end I gear the shafts 3 together by any suitable means. The best arrangement with the machine as at present laid out is shown particularly in Figs. 1, 2 and 6. The shafts 39 at opposite ends of the machine are geared by means of bevel gearing 40 to the adjacent shaft 3. The inner ends of these shafts 39 are geared by means of the spur gears 41 with the intermediate shaft 42 which is sufficiently raised to clear the gear wheel 9 which stands in the way of directly joining up the shafts 39.

The upper surface of the main frame of the machine is formed with the guides 43 which are preferably provided with ribs 44 engaging in corresponding grooves in the dies 7 which are thus held securely against lateral movement. At the base of the main frame I provide a series of antifriction rollers 45 on which the plates may travel thus easing the strain on the sprocket chains 5. These antifriction rollers are preferably connected to the spindles 46 journaled in open bearings 47 at the sides of the base of the frame.

Figure 8:
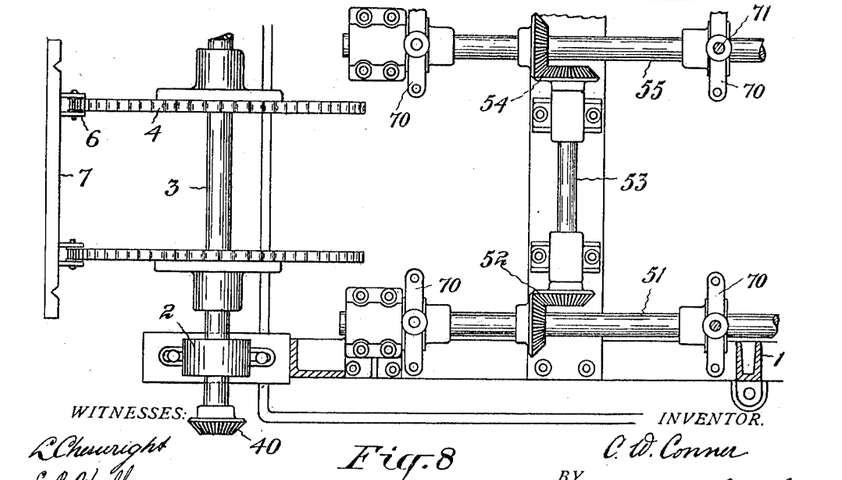
Fig. 8 is a plan view, partly broken away, of parts of the constructions shown in Fig. 7.
Figure 9:
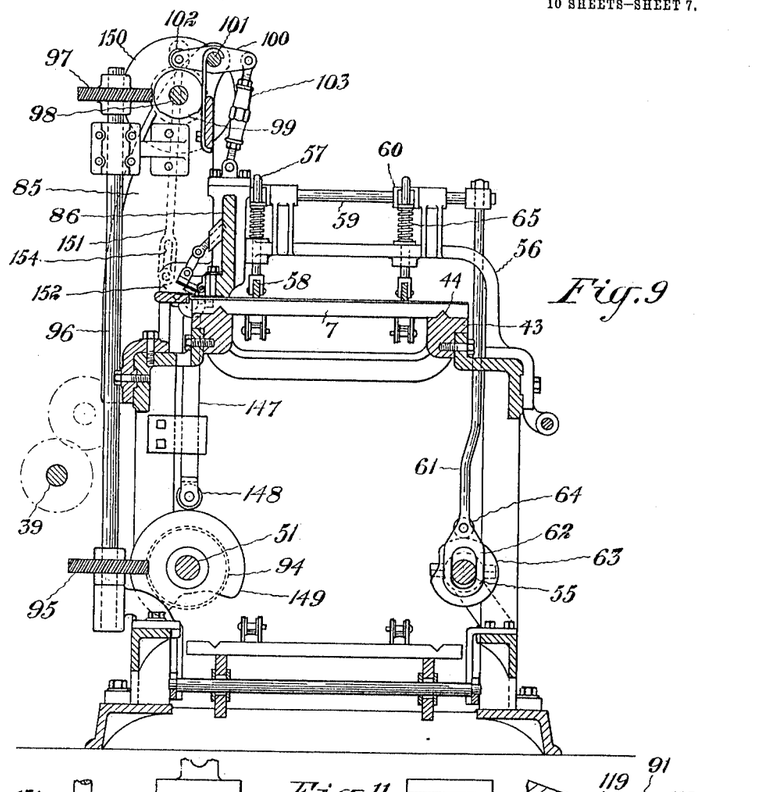
Fig. 9 is a vertical section through the folding mechanism.
Figures 13, 14, 26:
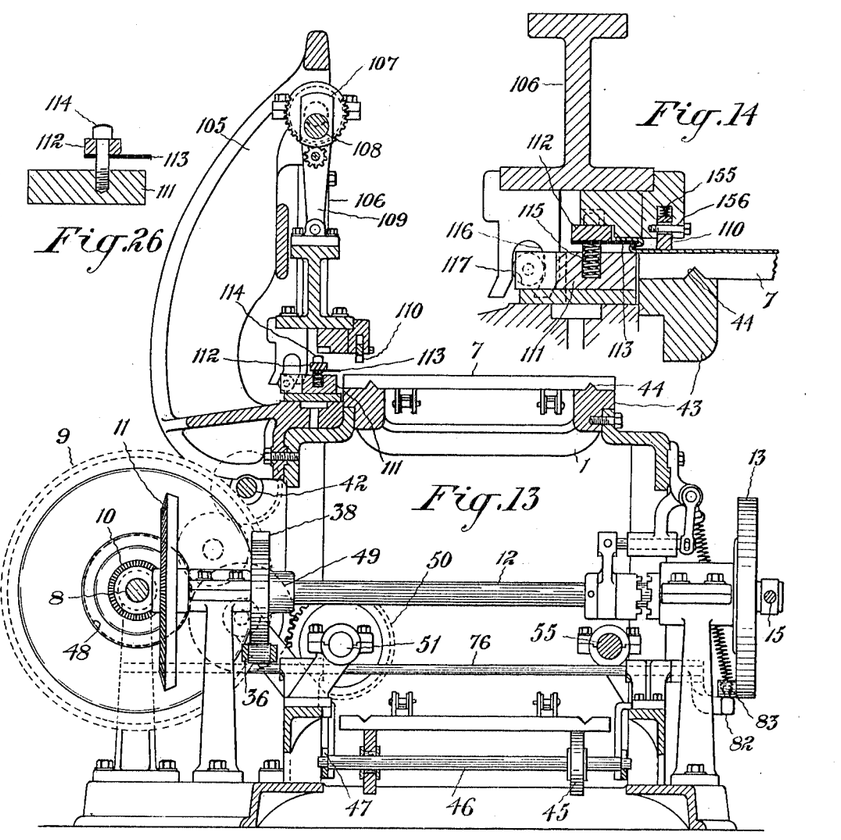
Fig. 13 is a vertical section through the mechanism for compressing the folded edge.
Fig. 14 is a sectional detail illustrating the compressing operation.
Fig. 26 is a cross section of the mandrel carrying bar and the slide of the lock compressing mechanism.
Figure 15:
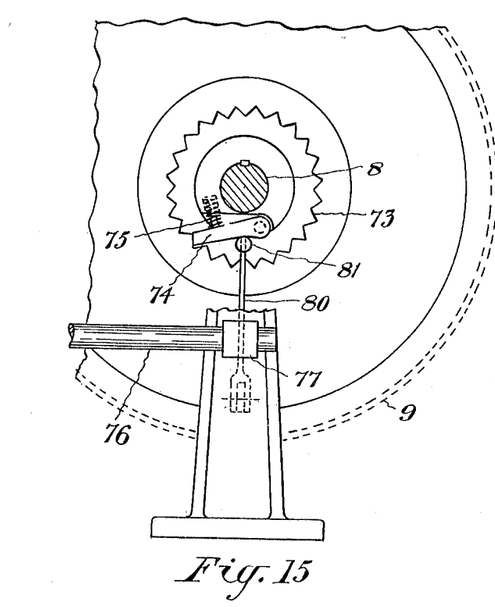
Fig. 15 is a detail illustration showing the clutch controlling the operation of the lock-forming mechanisms.
Figure 16:
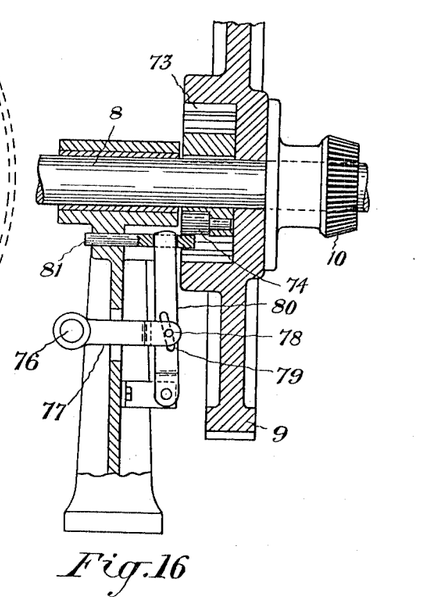
Fig. 16 is a vertical section of the same.
Figure 17:
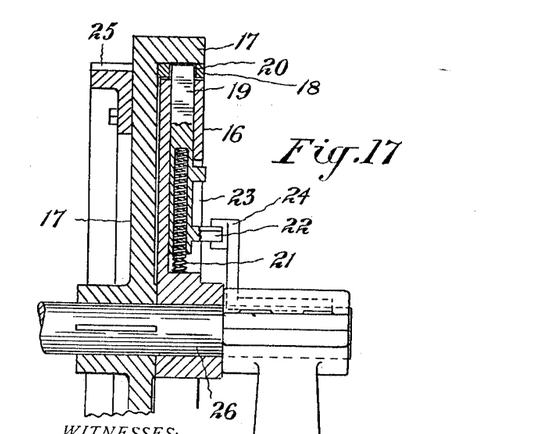
Fig. 17 is a section of the rock arm and ratchet wheel giving the intermittent drive to the traveling bed.

The necessary drive for the various lock-forming mechanisms and for certain clamping means to be hereinafter described is obtained by means of the following mechanisms: The shaft 8 has a gear wheel 48 secured thereto which meshes with the gear wheel 49 suitably journaled on the frame and meshing with the gear wheel 50 fast on the longitudinal shaft 51 (see Fig. 13). This shaft 51 is geared by means of bevel gearing 52 to the transverse shaft 53 which is geared by means of bevel gearing 54 to the longitudinal shaft 55 (see Fig. 8). These shafts 51 and 55 actuate clamping means for the shingles constructed as follows: Two bridges 56 span the main frame (see particularly Figs. 3 and 9). In these bridges slide rods 57 are slidably supported. These slide rods at their lower ends carry the presser bars 58 which extend longitudinally of the machine just above the upper surfaces of the plates 7 carrying the shingles. To apply pressure to these bars to firmly hold the shingles when the lock forming mechanisms are in operation I provide the rock shafts 59 suitably journaled on the bridges. These rock shafts have secured thereto rock arms 60 preferably embracing the slide rods 57. To these rock arms are pivotally connected the upper ends of the slide rods 61. These slide rods at their lower ends are connected with the yokes 62 embracing the shaft 55. On the shaft are secured cams 63 and on each yoke is secured an antifriction roller 64 engaging the periphery of the adjacent cam. These cams are so shaped and timed that the rock arms 60 are actuated to operate the presser bars 58 to clamp the shingles immediately after each forward movement of the bed and to release the same immediately after the lock forming mechanisms are operated.

The connection between the rock arms 60 and the slide rods 57 is by means of the coil springs 65 which engage the collars 162 on the slide rods and also engage beneath the forked ends of the rock arms 60 so that when the latter move downwardly spring pressure is applied to the bars 58. The ends of the presser bars 58 at the ingoing end of the machine are preferably spring pressed at all times (see Figs. 3, 7 and 27 of the drawings). For this purpose each bar is connected with a plunger 163 moving in a casing 164 secured to the cross bar 165 of the frame of the machine. The coil springs 166 are in a state of compression and tend to press the plungers downwardly to apply the desired pressure to the presser bars 58.

Figures 7, 27:
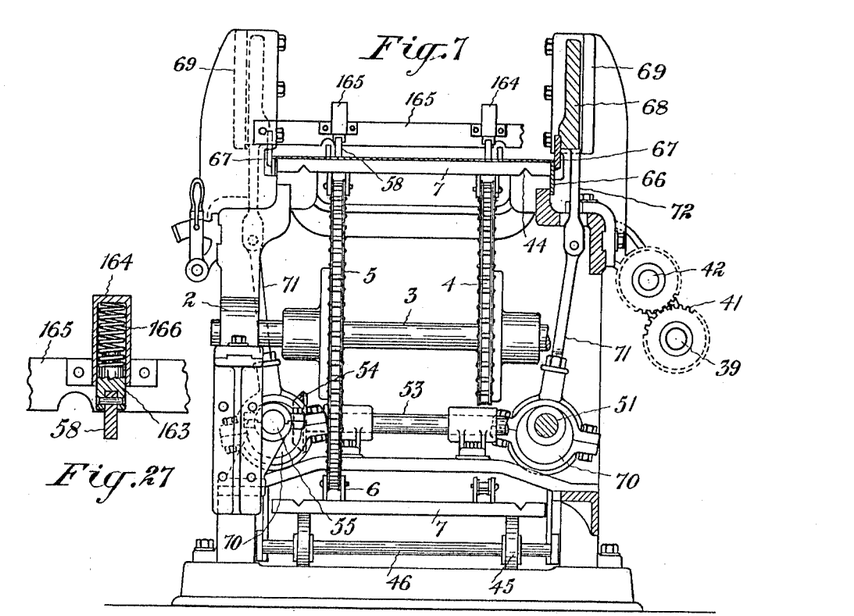
Fig. 7 is an end elevation, partly in section, looking from the left, in Fig. 1.
Fig. 27 is a sectional detail of one of spring pressure devices at the ingoing end of the longitudinal presser bars of the machine.

The first operation to be performed on the shingle is the truing of its sides which is performed by means of the mechanism best seen in Figs. 1 and 7 of the drawings. Shearing mechanisms are located at opposite sides of the machine each comprising a stationary knife 66 and a movable knife 67 carried by a head 68 vertically movable on suitable guides 69. The heads are reciprocated by means of the eccentrics 70 on the shafts 51 and 55, the eccentric rods 71 being pivotally connected with the depending arms 72 connected with the heads 68. As the shafts 51 and 55 are intermittently rotated the shearing movements will be effected at the proper time.

Before describing the construction and mode of operation of the remaining lock forming mechanisms it would be advisable to describe the means for causing the intermittent rotation of the shaft 8 which actuates the shafts 51 and 55 as heretofore described and also the other lock forming mechanisms. The gear wheel 9 has the internal ratchet wheel 73 formed therein with which engages the pivoted dog 74 yieldingly pressed by means of the coil spring 75 to its engaging position. A rock shaft 76 is journaled transversely of the machine (see particularly Figs. 2, 13, 15 and 16.) To the end of this shaft is secured a rock arm 77. At the end of this rock arm there is a pin 78 engaging in an inclined slot 79 formed in the shifter lever 80 fulcrumed at its lower end on a suitable part of the frame. The upper end of the shifter lever engages in a slot in a trip 81 slidably supported on a stationary part. It is evident that by rocking the rock shaft 76 this trip may be projected into and out of the path of the dog 74. The other end of the rock shaft 76 lies adjacent the disk 13 (see particularly Fig. 5) and has secured thereto the rock arm 82, the free end of which lies in the path of the pin 83 secured to the side of the disk 13. One or more coil springs 84 are connected to the rock arm 82 and to suitable stationary supports and tend to rock the arm to cause the shaft 76 to throw the trip 81 to its operative position in which it lies in the path of the dog 74 to disengage the latter from the ratchet wheel. When, however, the pin 83 depresses the arm 82 the trip 81 is drawn back to its inoperative position allowing the dog to engage the ratchet wheel 73 so that the gear wheel 9 will drive the shaft 8 until such time as the pin 83 has passed by the end of the rock arm 82. Thus the shaft 8 is actuated intermittently, its movements alternating with those of the traveling bed.

Figures 10, 11, 12:
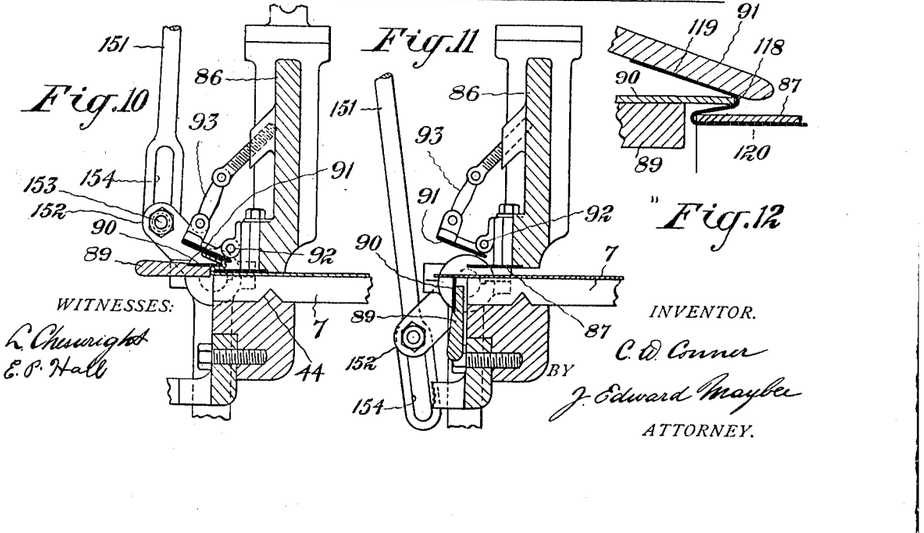
Figs. 10, 11 and 12 are sectional details illustrating the operation of folding the edge of the shingle.

After the sides of the shingle have been trimmed it passes forward to the folding mechanism shown particularly in Figs. 1, 9, 10, 11 and 12. This folding mechanism is provided with suitable guides 85 in which the clamp 86 is vertically slidable. This clamp carries at its lower edge the laterally projecting steel plate 87 forming a mandrel over which the shingle is bent as shown. The clamp at the proper moment is forced down on top of the shingle as shown in Fig. 10 by the mechanism hereinafter described. Coöperating with the mandrel 87 is the bending leaf 89 suitably journaled at its ends on the upper ends of the slides 147 suitably guided on the main frame. The lower ends of these slides are provided with antifriction rollers 148 which engage the cams 149 fast on the shaft 51 (see particularly Figs. 1 and 9.) Secured to the bending leaf is the mandrel 90, the edge of the mandrel being offset from the axis on which the bending leaf is journaled. Above the mandrel 87 is located an adjustable leaf 91 which is preferably hinged at 92 on the clamp 86 and is adjustable by means of the toggles 93, one half of each toggle being suitably connected with the leaf and the other half threaded into a suitable socket on the clamp. It is evident that by disconnecting these toggles and screwing their upper parts in or out before reconnecting them that any desired angle may be given to the hinged leaf 92. The folding operations are as follows: The clamp descends following which the bending leaf 89 is brought to the position shown in Figs. 10 and 12 folding the edge of the shingle into the S form shown. The parts are operated by the folding mechanism.

The shaft 51 has secured to it the worm 94 meshing with the worm wheel 95 on the vertical shaft 96 journaled on the frame of the machine. This vertical shaft 96 by means of the worm gearing 97 actuates the longitudinal cam shaft 98 carrying the cams 99. These cams actuate the rock arms 100 fulcrumed intermediate their ends on the shaft 101. These rock arms are preferably provided with antifriction rollers 102. The other ends of these rock arms 100 are connected with the clamp 86 by means of the connecting rods 103 which are adjustable in length in any ordinary manner. By this mechanism the clamp is moved to engage the shingle as already described. The return movement is effected by means of the springs 104 connected at one end with the clamp and at the other end with the shaft 101.

The bending leaf is brought to position by the raising of the slides 147. It is then turned on its journals from the position shown in Fig. 11 to the position shown in Fig. 10 by the following mechanism: Fast on the ends of the shaft 98 are the crank disks 150 to which are connected the upper ends of the connecting rods 151. The lower ends of these connecting rods are connected with the ends of the rock arms 152 secured to the ends of the bending leaf 89. The connection is by means of the pins 153 secured to the rock arms and engaging in the slots 154 formed in the connecting rods. The result of this arrangement is that immediately the bending leaf has been brought to its operative position by the raising of the slides 147 the pins 153 are at the bottoms of the slots 154 so that a rocking movement to the bending leaf is immediately imparted thereto by the action of the crank disks 150. A slight dwell occurs until the connecting rods 151 have been brought down to effect an engagement between the pins 153 and the upper ends of the slots 154. The bending leaf is then immediately turned to the position shown in Fig. 11. As this occurs the low parts of the cams 149 come below the lower ends of the slides 147 which immediately drop withdrawing the bending leaf entirely from the path of the folded edge of the shingle so that the latter is free to be moved to the next lock forming mechanism. It will be noted that the slot 154 permits of the raising and lowering of the bending leaf to and from its operative position and the rocking of the same at proper times.

Figure 5:
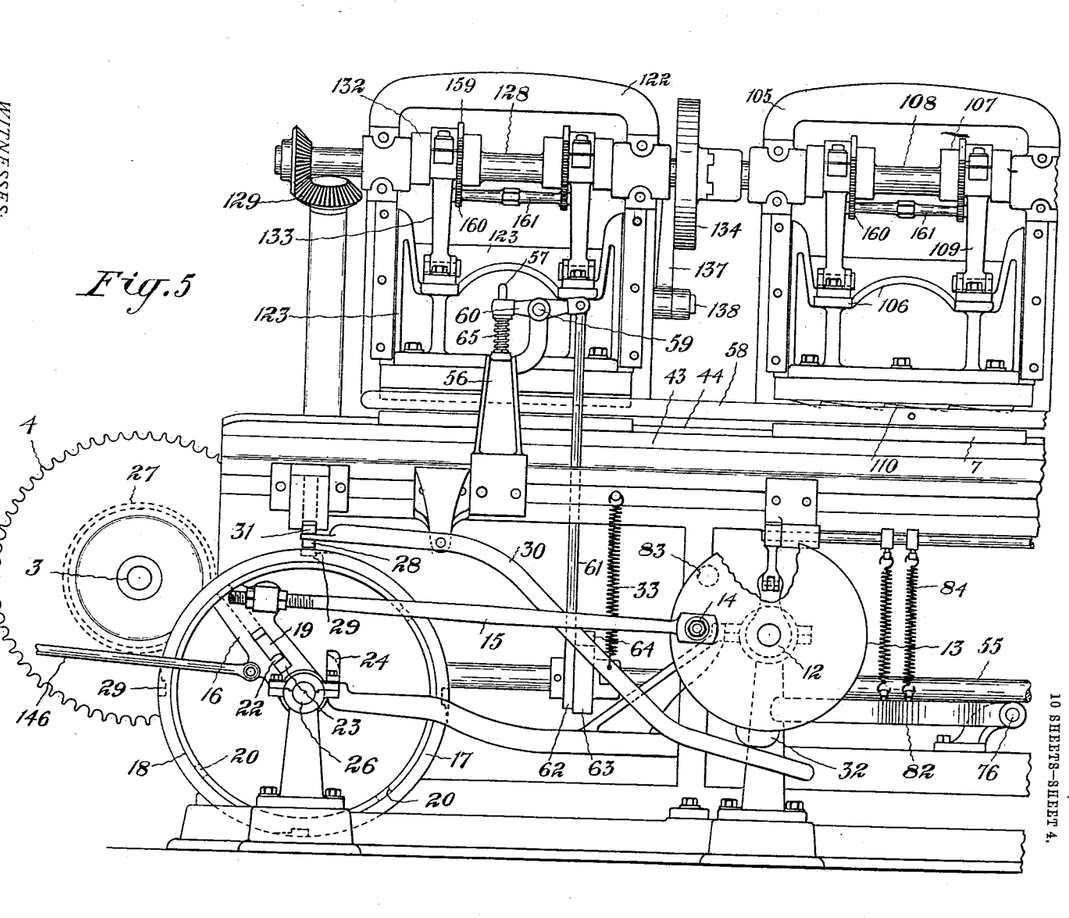
Fig. 5 is a side elevation of the half of the machine shown in Fig. 2, the view being taken from the other side.
Figure 25:
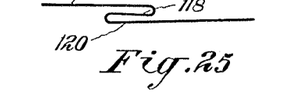
Fig. 25 is a cross section of the lock after compression.

From the folding mechanism the shingle passes to the compressing mechanism shown particularly in Figs. 2, 5, 13 and 14. The compressing mechanism comprises the frame 105 on which is suitably guided the vertically movable head 106. This head is reciprocated by means of the cranks 107 on the crank shaft 108 which are connected by means of the connecting rods 109 with the head 106. This head carries the presser bar 110 which as shown in Fig. 5 is shaped to fit the embossed surfaces of the shingle. The presser bar is preferably secured in place in a suitable socket so that different presser bars may be substituted to suit the configuration of the shingle being operated upon. These presser bars are pressed outwardly by the coil springs 155, the presser bar being held in place and its outward movement limited by the pin and slot connections 156. Slidably supported on the frame 105 is a slide 111 which carries a bar 112 to which is secured the laterally projecting mandrel 113. The bar is vertically movable on the bolts 114 screwed into the slide 111. The coil springs 115 tend to keep the bar 112 raised as shown. The head 106 carries an arm having a cam slot 116 formed therein engaging a projection 117 on the slide 111. From this it follows that as the cross head descends upon the shingle mandrel 113 is pushed into the fold 118 of the shingle which as shown in Fig. 12 has been left by the folding mechanism with the edge of the portion 119 at an angle to the horizontal. By the continued downward movement of the cross head the part 119 is flattened to the horizontal and the fold 120 compressed as seen in Fig. 25 the bar 112 yielding as may be necessary.

From the lock compressing mechanism the shingle passes to the mechanism forming the hook 121 at the edge of the lock. (See Figs. 2, 18 and 19.) This comprises the frame 122 secured to the frame and carrying on suitable guides the head 123. This head carries a presser bar 124 shaped to fit over the portion of the lock already formed shown particularly in Fig. 19 and preferably detachably held in a recess in the head so that different presser bars may be substituted if it be necessary. This presser bar is preferably spring actuated in the same manner as the presser bar 110 and the illustration of the former bar taken with Fig. 19 sufficiently indicates a suitable arrangement for the bar 124. Below the presser bar is suitably supported on the frame the mandrel 125 which extends laterally and outwardly to fit beneath the part 119 of the shingle just outside the fold 120. The slide 126 is suitably guided in a position downwardly inclined toward the shingle on the frame 122 and has a mandrel 127 formed on its edge adapted to pass below the mandrel 125 as shown.

Figures 18, 19, 20:
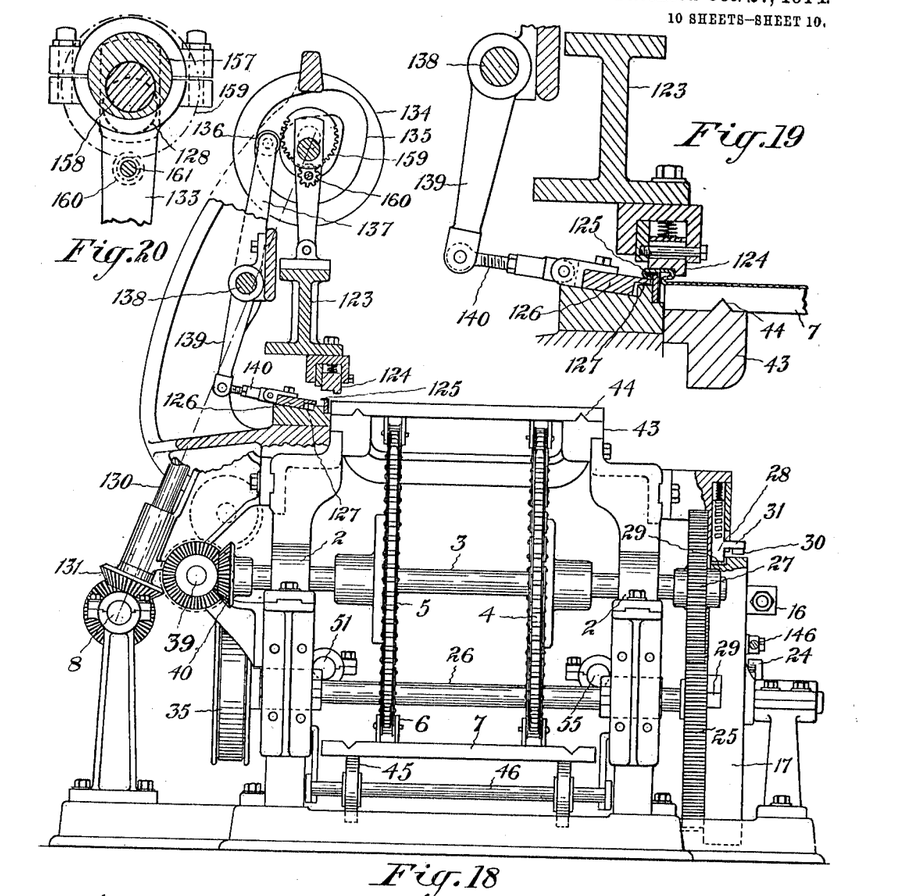
Fig. 18 is a vertical cross section through the lock finishing mechanism.
Fig. 19 is a sectional detail illustrating the finishing of the lock.
Fig. 20 is a sectional detail of the crank adjusting mechanism for the compressing and lock-finishing mechanisms.

In forming the hook 121 the head 123 first descends to support the lock as shown in Fig. 19 and the slide is then pressed inwardly to bend the edge of the shingle around the mandrel 125. Movements are imparted to the head 123 and the slide 126 in the following manner: The shaft 128 is journaled on the frame 122 and is driven by means of bevel gearing 129 from the inclined shaft 130 driven by the bevel gearing 131 from the intermittently driven shaft 8. This shaft by means of the cranks 132 actuates the connecting rods 133 connected with the head 123. The shaft 128 carries the cam 134 provided with a cam groove 135 in which engages the antifriction roller 136 journaled on the end of the rock arm 137 secured to the rock shaft 138 journaled on the frame. Secured to this shaft 138 are the rock arms 139. Connecting rods 140 are pivotally connected to the rock arms 139 and the slide 126. These connecting rods are preferably made adjustable in length in any well known manner so that the position of the mandrel 127 at the end of its forward movement may be accurately regulated.

It is preferable to make the cranks 107 and the cranks 132 adjustable in throw to take up wear and to provide means for regulating the lowest positions of the presser bars 110 and 124. For this purpose I provide the means shown particularly in Figs. 13 and 20 of the drawings. The upper ends of the connecting rods 109 or 133, as the case may be, have bearing brasses 157 journaled therein, the wrist pins 158 being journaled eccentrically in the brasses. The brasses have formed thereon or secured thereto the gears 159 which mesh with the pinions 160 secured to the spindles 161 journaled in the connecting rods and faced intermediate their ends to take a wrench. It is evident that by rotating the spindles the brasses 157 may be rotated to vary the position of the wrist pins as may be desired.

Figure 4:
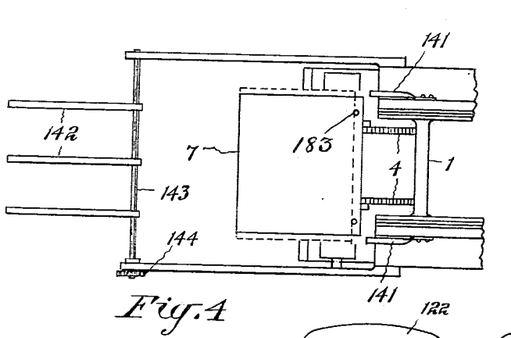
Fig. 4 is a plan view illustrating the discharge mechanism.
Figure 6:
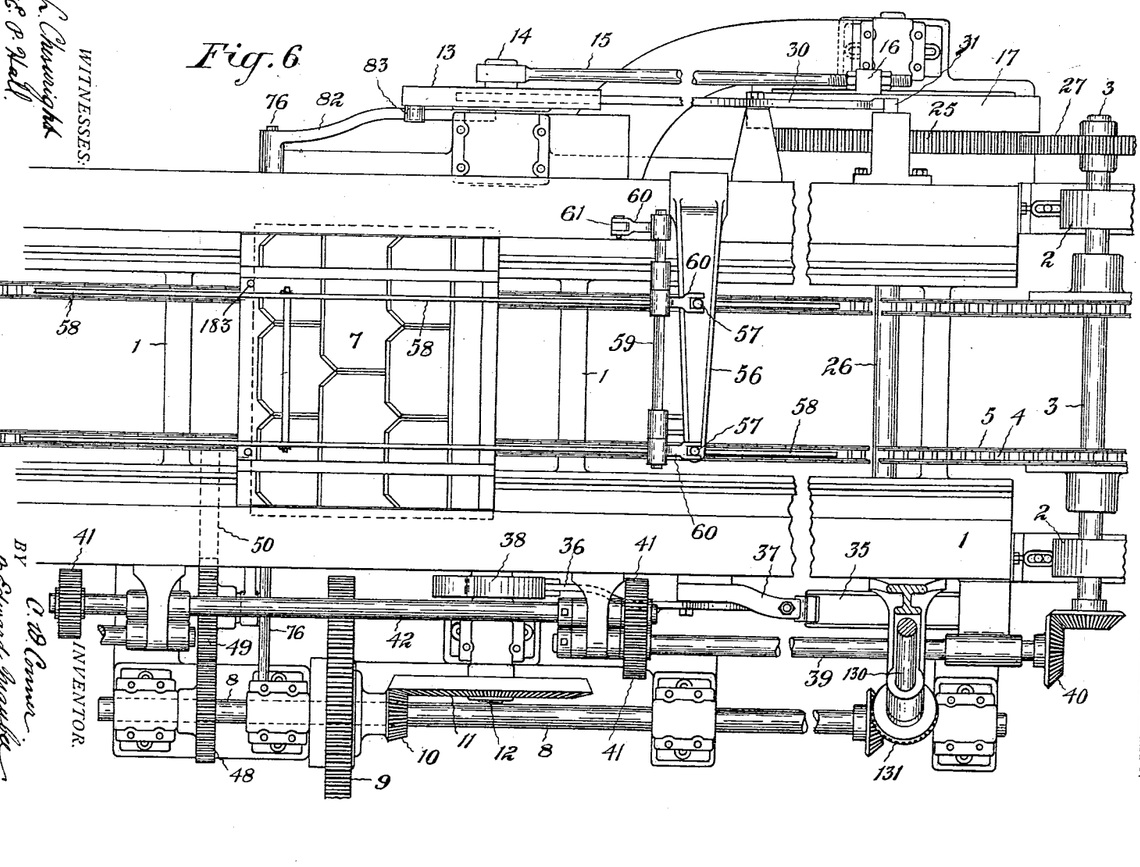
Fig. 6 is a plan view of the same end of the machine.

It will be noted particularly on reference to Figs. 4, 6 and 7 of the drawings that the edges of the shingle project at each side beyond the sides of the plates 7.

Secured to each side of the main frame are the bent springs 141 in such a position as to engage beneath each of the edges of the shingle immediately after it has been carried forward from the lock forming mechanism and to loosen it from the plate carrying it so that it will be received by the fingers 142 (see Fig. 3) onto which each shingle is pushed by the pins 183 at the rear of the plate as the latter is carried around the sprocket wheel 4. These fingers are secured to the spindle 143 journaled transversely on the frame and provided at one end with the gear wheel 144. With this gear wheel meshes the segmental rack lever 145 pivoted intermediate its ends and connected by means of a suitably pivoted connecting rod 146 with the rock arm 16. The fingers 142 are thus given an oscillating movement to eject the finished shingles.

Figures 21, 22:
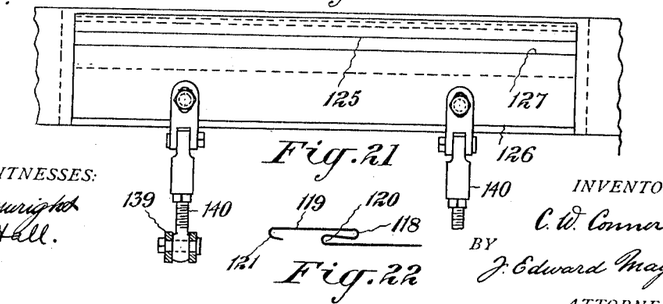
Fig. 21 is a plan view of the mandrel carrying slide of the lock-finishing mechanism.
Fig. 22 is a cross section of the finished lock.
Figure 23:
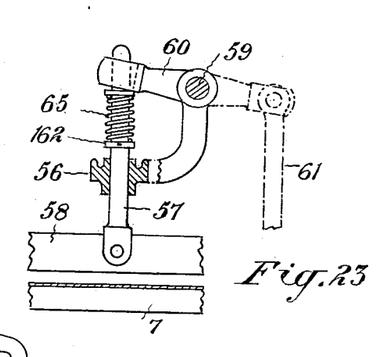
Fig. 23 is a side elevation, partly in section, of part of the mechanism actuating the presser bars which clamp the shingles on the plates carrying them.
Figure 24:
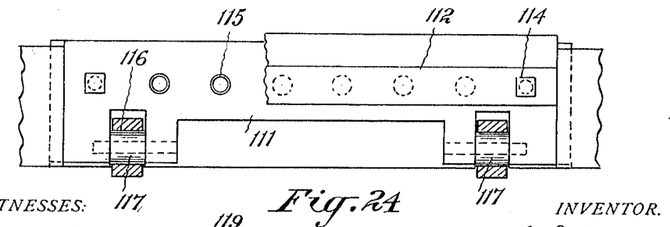
Fig. 24 is a plan view of the mandrel carrying slide of the lock compressing mechanism.

The operation of the machine is briefly as follows: The metallic sheets are placed on the plates 7 at the left hand side of the machine as shown in Fig. 1. The machine is then started in motion. The plate carrying the first sheet is moved to a position for the carrying out of the first operation, namely, the trimming of the edges of the sheet by the shearing mechanism shown in Figs. 1 and 7 of the drawings. The movement of the entire bed is stopped to enable the various operations to be performed on the metallic sheets by means of the intermittent motion mechanism described, the momentum being gradually absorbed by the brake mechanism, and the position of the traveling bed determined by the positive stop mechanism. While the trimming and lock forming mechanisms are operative, the presser bars 58 have the spring pressure applied thereto to firmly hold the metallic sheets in position which pressure is relieved during such time as the bed is moving. The sheet trimmed by the shearing mechanism at the next movement of the bed is brought into proper relationship with the first of the lock forming mechanisms, shown more particularly in Figs. 9, 10, 11 and 12 of the drawings, by which mechanism the edge of the shingle is folded into S form, as shown particularly in Fig. 12 of the drawings. It will be understood of course that between each movement of the bed forming mechanism a fresh metallic sheet is placed on one of the supporting plates of the endless bed so that while the machine is running a succession of plates is carried through the machine to be operated on by each of the various mechanisms in turn. From the folding mechanism, the metallic sheet is moved forward to the compressing mechanisms shown more particularly in Figs. 13 and 14. The function of this mechanism is to compress the S fold to the shape shown more particularly in Fig. 25. From the compressing mechanism the metallic sheet is moved to the lock forming mechanism shown more particularly in Figs. 18 and 19 by which the hook on the edge of the sheet is formed, the final result being shown in Fig. 22. From the lock forming mechanism the supporting plates move *seriatim* to the position shown more particularly in Fig. 3, the metallic sheets carried by the plates being ejected one by one by the automatic mechanism illustrated at the left hand side of that figure.

What I claim as my invention is:—

1. In a machine for forming locks on metallic sheets the combination of an endless traveling bed; a plurality of lock-forming mechanisms arranged in series adjacent thereto; means for alternately actuating the lock-forming mechanisms and for moving said bed to cause each sheet to be moved from one lock-forming mechanism to the next in the series while said mechanisms are non-operative; means for clamping said sheets to the bed while the lock-forming mechanisms are operating comprising a pair of bars longitudinal of the machine, and means for applying a yielding pressure to said bars when the lock-forming mechanisms are operating and for relieving the spring pressure while the traveling bed is in motion.

2. In a machine for forming locks on metallic sheets the combination of an endless traveling bed; a plurality of lock-forming mechanisms arranged in series adjacent thereto; means for alternately actuating the lock-forming mechanisms and for moving said bed to cause each sheet to be moved from one lock-forming mechanism to the next in the series while said mechanisms are non-operative; means for clamping said sheets to the bed while the lock-forming mechanisms are operating, comprising a pair of bars longitudinal of the machine; means for applying a yielding pressure to said bars when the lock-forming mechanisms are operating; and means for applying a constant yielding pressure to the bars at the ends from which the bed is traveling.

3. In a machine for forming locks on metallic sheets the combination of an endless traveling bed; a plurality of lock-forming mechanisms arranged in series adjacent thereto; means for alternately actuating the lock-forming mechanisms and for moving said bed to cause each sheet to be moved from one lock-forming mechanism to the next in the series while said mechanisms are non-operative; a friction brake adapted to check the momentum of the traveling bed; means for applying said brake just previous to the time the lock-forming mechanisms operate and for releasing it after the bed has stopped; and positive stop mechanism adapted to lock the bed after each movement thereof and to release it after each action of the lock-forming mechanisms.

4. In a machine for forming locks on metallic sheets the combination of bed-carrying drums geared together for simultaneous operation; an endless bed carried thereby; a plurality of lock-forming mechanisms arranged in series adjacent the bed; driving means therefor; a constantly driven shaft; a clutch whereby the driving means for the lock-forming mechanisms may be put in gear with the constantly driven shaft; means whereby said shaft actuates said clutch; and means whereby said shaft imparts a step-wise movement to the bed-carrying drums.

5. In a machine for forming locks on metallic sheets the combination of bed-carrying drums geared together for simultaneous operation; an endless bed carried thereby; a plurality of lock-forming mechanisms arranged in series adjacent the bed; rotatable means journaled longitudinally of the machine; driving connections between said rotatable means and the lock-forming mechanisms; a constantly driven shaft geared to the said rotatable means, said gearing including a clutch; means whereby said shaft actuates said clutch and means whereby said shaft imparts a stepwise movement to the bed-carrying drums.

6. In a machine for forming locks on metallic sheets the combination of bed-carrying drums geared together for simultaneous operation; an endless bed carried thereby; a plurality of lock-forming mechanisms arranged in series adjacent the bed; driving means therefor; a constantly driven shaft; a clutch whereby the driving means for the lock-forming mechanisms may be put in gear with the constantly driven shaft; means whereby said shaft actuates said clutch; means whereby said shaft imparts a step-wise movement to the bed-carrying drums; positive stop mechanism adapted to lock the bed after each movement thereof and to release it after each action of the lock-forming mechanisms; and means actuated by said constantly driven shaft for applying said brake.

7. In a machine for forming locks on metallic sheets the combination of bed-carrying drums geared together for simultaneous operation; an endless bed carried thereby; a plurality of lock-forming mechanisms arranged in series adjacent the bed; driving means therefor; a constantly driven shaft; a clutch whereby the driving means for the lock-forming mechanisms may be put in gear with the constantly driven shaft; means whereby said shaft actuates said clutch; means whereby said shaft imparts a step-wise movement to the bed-carrying drums; a friction brake adapted to check the momentum of the traveling bed; and means for actuating said brake from the constantly driven shaft just previous to the time the lock-forming mechanisms operate and for releasing it after the bed has stopped.

8. In a machine for forming locks on metallic sheets the combination of bed-carrying drums geared together for simultaneous operation; an endless bed carried thereby; a plurality of lock-forming mechanisms arranged in series adjacent the bed; driving means therefor; a constantly driven shaft; a clutch whereby the driving means for the lock-forming mechanisms may be put in gear with the constantly driven shaft; means whereby said shaft actuates said clutch; means whereby said shaft imparts a step-wise movement to the bed-carrying drums; and positive stop mechanism adapted to lock the bed after each movement thereof and to release it after each action of the lock-forming mechanisms, said brake and stop being actuated from said constantly driven shaft.

9. In a machine for forming locks on metallic sheets the combination of bed-carrying drums geared together for simultaneous operation; a plurality of lock-forming mechanisms arranged in series adjacent the bed; a longitudinal shaft; a driving gear wheel having a clutch connection therewith; driving connections between said shaft and the various lock forming mechanisms; a transverse shaft geared to the longitudinal shaft; means carried by said transverse shaft for actuating the clutch; a rotatable disk geared to one of the bed-carrying drums; a rock arm concentric therewith; a crank on the transverse shaft; a connecting rod connecting the rock arm and crank; and ratcheting connections between the rock arm and disk.

10. In a machine for forming locks on metallic sheets the combination of bed-carrying drums geared together for simultaneous operation; a plurality of lock-forming mechanisms arranged in series adjacent the bed; a longitudinal shaft; a driving gear wheel having a clutch connection therewith; driving connections between said shaft and the various lock-forming mechanisms; a transverse shaft geared to the longitudinal shaft; means carried by said transverse shaft for actuating the clutch; a rotatable disk geared to one of the bed-carrying drums; a rock arm concentric therewith; a crank on the transverse shaft; a connecting rod connecting the rock arm and crank; ratcheting connections between the rock arm and disk; discharge arms hinged adjacent the rear bed-carrying drum; and connections between the rock arm and the discharge arms for rocking the latter.

11. In a machine for forming locks on metallic sheets the combination of an endless traveling bed; a plurality of lock-forming mechanisms arranged in series adjacent thereto and comprising means for forming an S fold at the side of the sheet, means for compressing the same and means for forming a hook at the edge; and means for alternately actuating the lock-forming mechanisms and for moving said bed to cause each sheet to be moved from one lock-forming mechanism to the next in the series while said mechanisms are non-operative.

12. In a machine for forming locks on metallic sheets the combination of an endless traveling bed; a plurality of lock-forming mechanisms arranged in series adjacent thereto and comprising means for trimming the sides of the sheet, means for forming an S fold at the side of the sheet, means for compressing the same and means for forming a hook at the edge; and means for alternately actuating the lock-forming mechanisms and for moving said bed to cause each sheet to be moved from one lock-forming mechanism to the next in the series while said mechanisms are non-operative.

13. In a machine for forming locks on metallic sheets the combination of an endless traveling bed; a longitudinal shaft; folding mechanism for the edge of a sheet comprising a vertically movable part and a rocking part movable to and from a position to coöperate with the vertically movable part; means actuated by said shaft and adapted to move said rocking part to and from its coöperating position; a second longitudinal shaft geared to the first; means actuated by said second shaft to actuate the vertically movable part; a crank on said shaft; a rock arm on the rocking part; and a connecting rod connecting the crank and the rock arm adapted to permit the rock arm and rocking part to drop to the non-coöperating position when the crank is at the lowest part of its throw.

14. In a machine for forming locks on metallic sheets the combination of an endless traveling bed comprising a plurality of supporting plates for metal sheets suitably linked together, each plate adapted to support a sheet with its edges overlapping the sides of the plate, and to act as an anvil in coöperation with a lock-forming mechanism; a plurality of lock-forming mechanisms arranged in series adjacent thereto, one of said mechanisms being adapted to utilize the said plates as anvils; and means for alternately actuating the lock-forming mechanisms and for moving said bed to cause each sheet to be moved from one lock-forming mechanism to the next in the series while said mechanisms are non-operative.

15. In a machine for forming locks on metallic sheets the combination of an endless traveling bed comprising a plurality of supporting plates for metal sheets suitably linked together, each plate adapted to support a sheet with its edges overlapping the sides of the plate, and to act as an anvil in coöperation with a lock-forming mechanism; a plurality of lock-forming mechanisms arranged in series adjacent thereto, one of said mechanisms being adapted to utilize the said plates as anvils; means for alternately actuating the lock-forming mechanisms and for moving said bed to cause each sheet to be moved from one lock-forming mechanism to the next in the series while said mechanisms are non-operative; and means for clamping said sheets to the bed while the lock-forming mechanisms are operating.

16. In a machine for forming locks on metallic sheets the combination of an endless traveling bed comprising a plurality of supporting plates for metal sheets suitably linked together; a plurality of lock-forming mechanisms arranged in series adjacent thereto and comprising means for forming an S fold at the side of the sheet; means for compressing the same; means for forming a hook at the edge; and means for alternately actuating the lock-forming mechanisms and for moving said bed to cause each sheet to be moved from one lock-forming mechanism to the next in the series while said mechanisms are non-operative.

17. In a machine for forming locks on metallic sheets the combination of an endless traveling bed comprising a plurality of supporting plates for metal sheets suitably linked together; a plurality of lock-forming mechanisms arranged in series adjacent thereto and comprising means for trimming the sides of the sheet, means for forming an S fold at the side of the sheet, means for compressing the same and means for forming a hook at the edge; and means for alternately actuating the lock-forming mechanisms and for moving said bed to cause each sheet to be moved from one lock-forming mechanism to the next in the series while said mechanisms are non-operative.

18. In a machine for forming locks on metallic sheets the combination of means for supporting the sheets in a series of consecutive positions; a plurality of lock-forming mechanisms arranged in series adjacent said positions and comprising means for forming an S fold at the side of the sheet, means for compressing the same, means for forming a hook at the edge; and means for alternately actuating the lock-forming mechanisms and for moving each sheet from one lock-forming mechanism to the next in series while said mechanisms are non-operative.

19. In a machine for forming locks on metallic sheets the combination of means for supporting the sheets in a series of consecutive positions; a plurality of lock-forming mechanisms arranged in series adjacent said positions and comprising means for trimming the sides of the sheet, means for forming an S fold at the side of the sheet, means for compressing the same, means for forming a hook at the edge; and means for alternately actuating the lock-forming mechanisms and for moving each sheet from one lock-forming mechanism to the next in series while said mechanisms are non-operative.

20. In a machine for forming locks on metallic sheets the combination of means for supporting and carrying the sheets; a longitudinal shaft; folding mechanism for the edge of a sheet comprising a vertically movable part and a rocking part movable to and from a position to coöperate with the vertically movable part; means actuated by said shaft adapted to move said rocking part to and from its coöperating position; a second longitudinal shaft geared to the first; means actuated by said second shaft to actuate the vertically movable part; a crank on said shaft; a rock arm on the rocking part; and a connecting rod connecting the crank and the rock arm adapted to permit the rock arm and rocking part to drop to the non-coöperative position when the crank is at the lowest part of its throw.

Toronto, this 19th day of Sept., 1912.

CARLTON W. CONNER.

Signed in the presence of—
J. Edw. Maybee,
E. P. Hall.